Jan. 4, 1949. A. C. RUGE 2,458,481
LOAD WEIGHING DEVICE
Filed Sept. 1, 1944
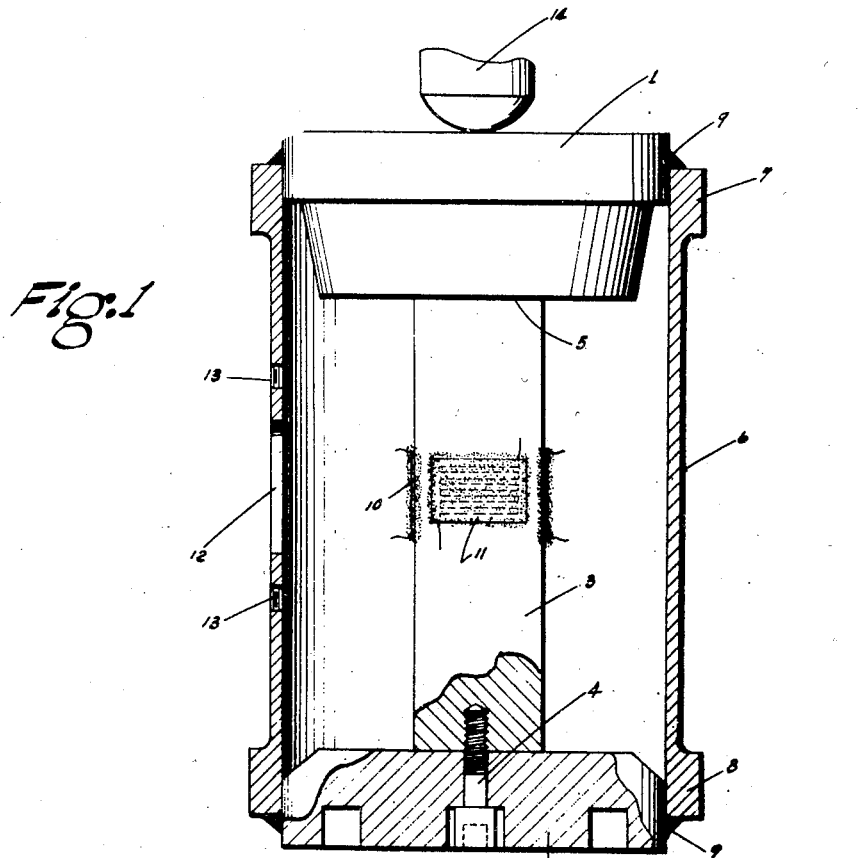
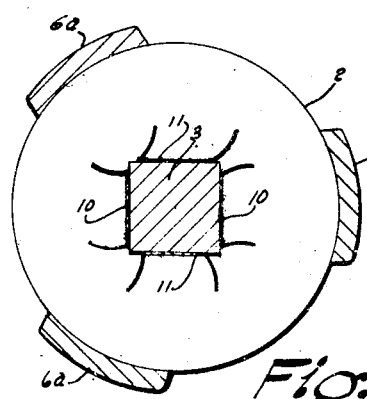
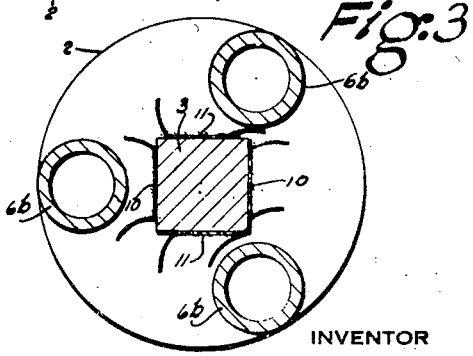
INVENTOR
Arthur C. Ruge
BY
ATTORNEY Patented Jan. 4, 1949

2,458,481

UNITED STATES PATENT OFFICE 2,458,481

LOAD WEIGHING DEVICE

Arthur C. Ruge, Cambridge, Mass., assignor to The Baldwin Locomotive Works, a corporation of Pennsylvania Application September 1, 1944, Serial No. 552,326

6 Claims. (Cl. 73—141)

This invention relates generally to load or force measuring means and more particularly to such a device known as a load weighing plug or cell.

Devices of this kind are useful in a great many applications where a load is to be weighed or a compression force is to be measured and it is particularly applicable to portable uses because of its relatively light weight although it is also useful in permanent installations such as platform scales, rolling mills where the load is transmitted to the rolls through a screw, or in weigh cars as well as many other applications. Many different forms of such devices have heretofore been proposed and used, some of which are of the solid plug type in which the expansion of the plug in response to an axial load thereon is used to determine the load. In other instances, multiple column type plugs have been used in order to minimize the effects of undesired forces such as torsion of shear forces. These devices as well as others have very serious objections either functionally, structurally or economically as is well-known to those skilled in the art.

It is an object of my invention to provide an improved load weighing device which minimizes the effect of undesired forces in a relatively simple and effective manner while still maintaining a high degree of accuracy, sensitivity and responsiveness together with being extremely rugged and relatively compact, light in weight and economical in construction, operation and maintenance.

In the specific aspect of my invention I employ preferably a single sensitive weighing column positioned between two opposed heads which are rigidly connected together by an outer cylindrical shell of such thickness and size that it is capable of transmitting a portion of the load from one head to the other and thereby shunt a part of the load around the sensitive column whereby as a result of this strength of the shell it is adapted to prevent the transmission of eccentric loads or other undersirable forces from the heads to the single weighing column. The single column may be formed separately from the heads or as an integral part thereof which is well-known in the art insofar as a weighing column with heads is concerned as shown in Patent No. 2,327,935, but which of course does not have my novel load shunting means. This means is preferably a shell of either circular or square cross-section although other forms of such means may be used, certain of which among other equivalent forms are illustrated herein. The functional and structural relations between this outer load shunting means and the sensitive weighing column are such that I overcome the many disadvantages of the multiple column type weighing plug which requires transmitting the entire axial load through the weighing columns thereby necessitating a thin flexible diaphragm for laterally stabilizing the weighing columns as well as involving many mechanical and economic problems. The principle of resisting undesired forces by a heavy member which actually shunts a part of the load to be weighed around the sensitive column may, of course, be used with several columns if desired. The column or columns are, in effect, load index means in that they and the gages are calibrated on the basis of the total load weighed even though they carry less than the total.

Other objects and advantages will be more apparent to those skilled in the art from the following description of the accompanying drawing in which:

Fig. 1 is a partial longitudinal sectional view through my improved plug;

Figs. 2 and 3 are horizontal sections of modified arrangements for resisting undesired forces and carrying a part of the load.

In the particular embodiment of the invention disclosed herein, I have shown my improved load weighing plug as consisting of upper and lower relatively heavy and preferably circular heads 1 and 2 between which a single centrally located load weighing column 3 is disposed preferably of square cross-section although any other suitable shape of cross-section may be used. The lower end of the column and the upper surface of head 2 are preferably lapped and are secured together by screw 4 or other suitable means. In this specific arrangement, the upper end of the column and the undersurface 5 of head 1 are not secured together but instead have an abutting lapped contact with each other. An outer straight shell 6 of preferably circular and closed circumferential form has relatively heavy flange-like ends 7 and 8 which are preferably continuously circumferentially welded to the heads 1 and 2 at the corners 9 so that no relative movement occurs between each head and the shell at the points of connection. In addition, such welding together with the complete circumferential closure of the shell provides a hermetic seal if service conditions so require such as extremes of climate, or even submersion in water. The electrical connections to be described would be, of course, hermetically sealed in a well-known manner. The intermediate portion of the shell is preferably about 1/16" thick for a 3" inside diameter and a 5½" overall length designed for 40,000 pounds capacity. Instead of a closed shell, three or more partial circumferential or flat portions 6a may be used or individual vertical hollow or solid struts 6b of circular or other cross-sectional form may be employed. The whole of the material is preferably made of any suitable alloy heat treated steel, although other metals can be used depending upon the load capacity and severity of service.

Strain gages 10 are placed upon the weighing column 3 preferably at an intermediate portion thereof to eliminate end effects of the column in a manner well-known in the art. These gages are preferably of the bonded resistance wire type disclosed in Simmons Patent 2,292,549, although other well-known impedance-sensitive gages such as electromagnetic gages, etc., may be used if desired. The gages may extend vertically on two of the diametrically opposite sides of the square column 3 while other gages 11 may extend transversely. In order to obtain maximum sensitivity and temperature compensation as disclosed in my Patent 2,322,319, these gages as well as any other electrical impedance type gages may be suitably connected in a measuring circuit shown for example in various patents referred to herein. The lead wires for these gages may extend through an openings 12 in shell 6 and any suitable screw holes 13 may be provided in the shell for holding a conduit coupling if desired. It will of course be understood that if it is desired to obtain temperature compensation by a so-called dummy gage, a non-load supporting column may be inserted within the plug and secured to only one of the heads and free of the other, the principle of which is disclosed in my Patent 2,344,642. However, these various details do not constitute the novelty of my present invention which is directed particularly to having the shell 6 of such strength that it will resist eccentric loading as well as angular loading (shear) and torsion. This outer shell will thereby resist these unwanted loadings and at the same time carry only a fraction, say ⅓, of the vertical load on the cell which is generally applied through a spherical loading element 14.

As a result of my improved arrangement, I am able to make a load weighing plug which is relatively economical in construction, operation and maintenance combined with the many other desirable qualities heretofore mentioned.

It will of course be understood that various changes in details of construction and arrangement of parts may be made by those skilled in the art without departing from the spirit of the invention as set forth in the appended claims.

I claim:

1. A load weighing device comprising, in combination, a pair of opposed transverse elements which are inflexible in all directions, load weighing means disposed between said elements and adapted to transmit an axial load from one element to the other, and substantially axially extending means connected directly to said inflexible elements for rigidly connecting the same together to resist entirely through said axial means transmission of undesired forces from said elements to the weighing means but at the same time transmit only a part of the load to be weighed while the remainder of the load is transmitted through said load weighing means which is calibrated to serve as an index for the entire load.

2. The combination set forth in claim 1 further characterized in that said load weighing means has a column disposed between said inflexible elements to transmit load from one to the other and is provided with strain responsive means thereon, and said rigid connecting means comprises a shell extending directly between said elements and secured thereto so that relative movement does not occur between each of the elements and the respective ends of the shell.

3. The combination set forth in claim 1 further characterized in that said rigid connecting means is a shell of closed cross-section.

4. The combination set forth in claim 1 further characterized in that said rigid connecting means is a shell of closed cross-section and the load weighing means is a column.

5. The combination set forth in claim 1 further characterized in that said rigid connecting means is a shell of closed cross-section and the load weighing means is a column one end of which has only abutting contact with one of the elements.

6. The combination set forth in claim 1 further characterized in that said load weighing means has a single load weighing column secured to one of said elements and has abutting contact with the other and is located substantially centrally of the elements.

ARTHUR C. RUGE.

REFERENCES CITED

The following references are of record in the file of this patent:

UNITED STATES PATENTS

| Number | Name | Date |
|---|---|---|
| 1,972,578 | Wallichs | Sept. 4, 1934 |
| 2,050,106 | Lorig et al. | Aug. 4, 1936 |
| 2,053,560 | Janovsky | Sept. 8, 1936 |
| 2,285,580 | Hanson | June 9, 1942 |
| 2,327,935 | Simmons | Aug. 24, 1943 |
| 2,330,432 | Fossati | Sept. 28, 1943 |
| 2,396,916 | Guthrie | Mar. 19, 1946 |

FOREIGN PATENTS

| Number | Country | Date |
|---|---|---|
| 7,524 | Great Britain | May 14, 1890 |
| 403,098 | Great Britain | Dec. 11, 1933 |
| 445,345 | Germany | June 3, 1937 |